(12) United States Patent
Thompson et al.

(10) Patent No.: US 12,305,083 B1
(45) Date of Patent: May 20, 2025

(54) TWO-PART EPOXY ADHESIVE WITH WORKING LIFE COLOR CHANGE INDICATOR

(71) Applicant: 3M INNOVATIVE PROPERTIES COMPANY, St. Paul, MN (US)

(72) Inventors: Zachary J. Thompson, Woodbury, MN (US); Jay S. Schlechte, Oakdale, MN (US); Charlotte C. Clark, Minneapolis, MN (US); Erin A. Suchara, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/856,309

(22) PCT Filed: Jun. 14, 2023

(86) PCT No.: PCT/IB2023/056171
§ 371 (c)(1),
(2) Date: Oct. 11, 2024

(87) PCT Pub. No.: WO2023/242782
PCT Pub. Date: Dec. 21, 2023

Related U.S. Application Data

(60) Provisional application No. 63/352,797, filed on Jun. 16, 2022.

(51) Int. Cl.
| | | |
|---|---|---|
| *C09J 163/00* | (2006.01) | |
| *C08G 59/50* | (2006.01) | |
| *C08G 59/56* | (2006.01) | |
| *C09J 5/00* | (2006.01) | |
| *C09J 11/04* | (2006.01) | |
| *C09J 11/06* | (2006.01) | |
| *C09J 11/08* | (2006.01) | |
| *B32B 15/092* | (2006.01) | |
| *B32B 27/18* | (2006.01) | |
| *B32B 27/20* | (2006.01) | |
| *B32B 27/26* | (2006.01) | |
| *B32B 27/38* | (2006.01) | |

(52) U.S. Cl.
CPC .............. *C09J 163/00* (2013.01); *C09J 5/00* (2013.01); *C09J 11/04* (2013.01); *C09J 11/06* (2013.01); *C09J 11/08* (2013.01); *C09J 2400/166* (2013.01)

(58) Field of Classification Search
None
See application file for complete search history.

(56) References Cited

U.S. PATENT DOCUMENTS

| | | |
|---|---|---|
| 3,030,329 A | 4/1962 | Warnsdorfer, Jr. et al. |
| 3,773,706 A | 11/1973 | Dunn |
| 4,164,492 A | 8/1979 | Cooper |
| 4,668,736 A | 5/1987 | Robins et al. |
| 4,704,331 A | 11/1987 | Robins et al. |
| 5,629,380 A | 5/1997 | Baldwin et al. |
| 8,809,422 B2 | 8/2014 | Lienert et al. |
| 9,315,698 B2 | 4/2016 | Zaffaroni et al. |
| 10,438,725 B2 | 10/2019 | Gundel |
| 10,611,061 B2 | 4/2020 | Johnson et al. |
| 10,647,897 B2 | 5/2020 | Bardts |
| 2011/0313082 A1 | 12/2011 | Popp |
| 2012/0225187 A1 | 9/2012 | Lienert et al. |
| 2013/0096234 A1 | 4/2013 | Jung |
| 2014/0171552 A1* | 6/2014 | Zaffaroni ............... C08G 59/40 523/456 |
| 2017/0355886 A1 | 12/2017 | Jung et al. |
| 2018/0272572 A1 | 9/2018 | Johnson et al. |
| 2019/0300760 A1 | 10/2019 | Makino et al. |

FOREIGN PATENT DOCUMENTS

| | | | |
|---|---|---|---|
| EP | 3670564 B1 | 9/2021 | |
| GB | 960276 A | 6/1964 | |
| KR | 102009212 B1 * | 8/2018 | .............. C09J 11/06 |
| WO | 2005030853 A1 | 4/2005 | |
| WO | 2012003204 A1 | 1/2012 | |
| WO | 2012123403 A1 | 9/2012 | |

OTHER PUBLICATIONS

Machine translation of KR-102009212-B1 (no date).*
International Search report for PCT International Application No. PCT/IB2023/056171, mailed on Oct. 2, 2023, 4 pages.

* cited by examiner

*Primary Examiner* — Michael J Feely

(57) ABSTRACT

A two-part epoxy adhesive comprises a Part A and a Part B. Part A comprises, based on the total weight of components a) and b): a) 99.5 to 99.99 weight percent of at least one curable epoxy resin; and b) 0.01 to 0.5 weight percent of at least one pH indicator dye exhibiting an abrupt color change from colorless to a color in the pH range of 8.0-10.6. Part B comprises, based on the total weight of components c)-f): c) 89 to 97 weight percent of at least one aliphatic primary polyamine; d) 1 to 3 weight percent of at least one tris(2, 4,6-dialkylaminoalkyl)phenol having from 13 to 24 carbon atoms; e) 1 to 3 weight percent of at least one aliphatic tertiary 1,3-bis(N,N-dialkylaminoalkyl)urea having from 6 to 24 carbon atoms; and f) 1 to 5 weight percent at least one of an alkali metal nitrate or an alkaline earth nitrate. The ratio of the total combined weight of components a) and b) to the total combined weight of components c)-f) is in the range 1.0 to 1.5. A reaction product thereof and a method of bonding are also disclosed.

15 Claims, No Drawings

TWO-PART EPOXY ADHESIVE WITH WORKING LIFE COLOR CHANGE INDICATOR

CROSS REFERENCE TO RELATED APPLICATIONS

This application is a national stage filing under 35 U.S.C. 371 of PCT/IB2023/056171, filed Jun. 14, 2023, which claims the benefit of Provisional Application No. 63/352,797, filed Jun. 16, 2022, the disclosure of which is incorporated by reference in its/their entirety herein.

BACKGROUND

Mixing, working life, and curing are critical to the effective performance of 2-part adhesives.

Degree of cure indicators (i.e., cure indicators) have been devised that change color during curing. For example, 3M Impact Resistant Structural Adhesive, 07333, a commercially available two-part epoxy adhesive, includes phenolphthalein as a cure indicator. During cure, the color changes from silver-grey to silver-purple. This enables a user to verify that the adhesive has cured but provides no other useful information on the kinetics of cure.

Similarly, PCT Patent Application No. PCT/IB2022/053582, filed Apr. 16, 2022, discloses a two-part epoxy adhesive that includes mix and cure indicator systems. While this may improve a user's confidence in the final adhesive bond strength, these indicator systems do not provide the user with specific guidance on when an adhesive bond can be formed (i.e., closed) and still achieve a suitable ultimate bond strength.

SUMMARY

A practical visual indicator system that monitors working life has not been developed to date. As used herein, the term "working life" refers to the period of time that a curable adhesive remains low enough in viscosity that it can still be easily applied to a part or substrate in a particular application and still provide an effective overlap shear strength.

Advantageously, the present disclosure provides just such a visual working life indicator for two-part epoxy resins. Using two-part epoxy adhesives as described hereinbelow, a user can have confidence that the adhesive is usable for bonding two substrates and achieve at least a predetermined level of overlap shear adhesion.

In a first aspect, the present disclosure provides a two-part epoxy adhesive comprising:
a Part A comprising, based on the total weight of components a) and b):
  a) 99.5 to 99.99 weight percent of at least one curable epoxy resin;
  b) 0.01 to 0.5 weight percent of at least one pH indicator dye exhibiting an abrupt color change from colorless to a color in the pH range of 8.0-10.6; and
a Part B comprising, based on the total weight of components c)-f):
  c) 89 to 97 weight percent of at least one aliphatic primary polyamine;
  d) 1 to 3 weight percent of at least one tris(2,4,6-dialkylaminoalkyl) phenol having from 13 to 24 carbon atoms;
  e) 1 to 3 weight percent of at least one aliphatic tertiary 1,3-bis(N,N-dialkylamino-alkyl) urea having from 6 to 24 carbon atoms; and
  f) 1 to 5 weight percent at least one of an alkali metal nitrate or an alkaline earth nitrate,
wherein the ratio of the total combined weight of components a) and b) to the total combined weight of components c)-f) is in the range 1.0 to 1.5.

In many preferred embodiments, wherein at least one of Part A or Part B further comprises reflective pigment.

In another aspect, the present disclosure provides a reaction product preparable by mixing Part A with Part B.

In yet another aspect, the present disclosure provides a method of bonding two substrates, the method comprising:
  disposing a reaction product according to the present disclosure between first and second substrates prior to said undergoing the visible color change; and
  sufficiently curing the reaction product to form an adhesive bond between the first and second substrates.

As used herein:
the phrase "exhibiting an abrupt color change from colorless to a color" refers to color as detected by a normal human eye having 20/20 vision using D65 spectral power distribution illumination.

Features and advantages of the present disclosure will be further understood upon consideration of the detailed description as well as the appended claims.

DETAILED DESCRIPTION

Two-part epoxy adhesives according to the present disclosure comprise a Part A and a Part B. In use, Part A and Part B are mixed together, which typically initiates a curing process in which the curable epoxy resin and amines react to form a crosslinked polymer network. Part A includes components a) and b).

Based on total weight of components a) and b), Part A includes 99.5 to 99.99 weight percent, preferably 99.5 to 99.8 weight percent, of at least one curable epoxy resin (i.e., the total amount of all curable epoxy resin(s) in Part A). Examples of suitable epoxy resins include those derived from epoxy-functionalized monomers such as monomers containing one or more multifunctional glycidyl ethers.

Typical monomers in curable epoxy resins include: glycidyl ethers of dihydric arenes, aliphatic diols or cycloaliphatic diols. Glycidyl ethers of aliphatic diols include linear or branched polymeric epoxides having one or more terminal epoxy groups such as, e.g., diglycidyl ethers of polyoxyalkylene glycols.

Examples of aromatic glycidyl ethers include those that can be prepared by reacting a dihydric arene with an excess of epichlorohydrin. Dihydric arenes, as referred to herein, are arenes having two hydrogen atoms available for a reaction with epichlorohydrin. Examples of useful dihydric arenes include resorcinol, catechol, hydroquinone, and the polynuclear phenols including p,p'-dihydroxydibenzyl, p,p'-di(hydroxyphenyl)sulfone, p,p'-dihydroxybenzophenone, 2,2'-di(hydroxyphenyl)sulfone, 2,2-dihydroxy-1,1-dinaphthylmethane, and the 2,2'-, 2,3'-, 2,4'-, 3,3'-, 3,4'-, and 4,4'-isomers of di(hydroxyphenyl)methane, 2,2-di(hydroxyphenyl)propane, 2,2-di(hydroxyphenyl)butane, 2,2-di(hydroxyphenyl)pentane, 1,1-di(hydroxyphenyl)-1-phenylpropane, 1,1-di(hydroxyphenyl)-1-phenylbutane, 1,1-di(hydroxyphenyl)-1-phenylpentane, di(hydroxyphenyl)tolylmethane, 1,1-di(hydroxyphenyl)-1-tolylethane, di(hydroxyphenyl)cyclohexylmethane, and 1,1-di(hydroxyphenyl)cyclohexane.

Some preferred examples of curable epoxy resins include those epoxy resins having one or more units derivable from bisphenol A, bisphenol F or both. Other preferred examples of epoxy resins include those that can be prepared by bisphenol A, bisphenol F or both with epichlorohydrin. The epoxy resins may have a molecular weight in the range of from about 170 to about 10,000 g/mol, preferably from about 200 to about 3,000 g/mol. The average epoxy functionality in the resin is typically greater than 1 or 2 and less than 4. Epoxy-novolac resins may also be used.

Examples of commercially available aromatic and aliphatic epoxides useful in the disclosure include: diglycidyl ether of bisphenol A (e.g., available as EPON 828, EPON 1001, EPON 1310, and EPON 1510 from Hexion Specialty Chemicals GmbH, Rosbach, Germany; DER-331, DER-332, and DER-334 available from Olin Corp., Niagara Falls, New York; diglycidyl ether of bisphenol F (e.g., EPICLON 830) available from Dainippon Ink and Chemicals, Inc.); and flame retardant epoxy resins (e.g., DER 560, a brominated bisphenol type epoxy resin available from Olin Corp.).

Based on total weight of components a) and b), Part A includes 0.01 to 0.5 weight percent, preferably 0.2 to 0.4 weight percent, of at least one pH indicator dye exhibiting an abrupt color change from colorless to a color in the pH range of 8.0-10.6 (i.e., the total amount of all pH indicator dye(s) in Part A exhibiting an abrupt color change from colorless to a color in the pH range of 8.0-10.6). Examples of suitable indicator dyes include phenolphthalein, o-cresolphthalein, ethyl bis(2,4-dimethylphenyl)acetate, and thymolphthalein. Of these, phenolphthalein, o-cresolphthalein, and ethyl bis(2,4-dimethylphenyl)acetate are more preferred.

In some embodiments, bromothymol blue (3,3-bis[3-bromo-4-hydroxy-2-methyl-5-(propan-2-yl)phenyl]-2,1$\lambda^6$-benzoxathiole-1,1 (3H)-dione) may be beneficially added in addition to the indicator dye(s). Addition of the bromothymol blue may enhance the appearance of the two-part epoxy adhesive during curing, thereby facilitating the determination of color change. If present, the amount of bromothymol blue is typically in a range of 5 to 15 percent of the total weight of the at least one pH indicator dye, although his is not a requirement.

Part B includes components c)-f) (i.e., components c), d), e), and f)).

Based on total weight of components c)-f), Part B includes 89 to 97 weight percent, preferably 93 to 96 weight percent, of at least one aliphatic primary polyamine (i.e., the total amount of aliphatic polyamine(s) wherein the amino groups are primary).

In one embodiment, useful aliphatic primary polyamines have a molecular weight of greater than about 150 g/mol and less than less than 3000 g/mol, for example, between 200 and 700 g/mol; however other molecular weights may also be used.

Examples of suitable aliphatic primary polyamines include aliphatic primary diamines and aliphatic primary triamines. Examples of suitable aliphatic primary diamines include those according to the general formula

$R^1R^2N$—$R^3$—$NR^4H$ (I)

wherein $R^1$, $R^2$ and $R^4$ independently represent hydrogen, a linear or branched alkyl or a linear or branched poly(oxyalkyl) moiety.

The residues $R^1$, $R^2$, $R^4$ may independently comprise an aliphatic hydrocarbyl group containing about 1 to 25 carbon atoms or an aliphatic polyether containing from 3 to 25 carbon atoms. Preferably, one, more preferably two, and more preferably all three of $R^1$, $R^2$, and $R^4$ are hydrogen.

$R^3$ represents a divalent linear or branched alkylene, aminoalkylene, poly(aminoalkylene), poly(amidoalkylene), poly(alkyleneoxy) residue having at least 5 carbon atoms. $R^3$ may also be a divalent residue of a polyamidoamine or a polyamidodiamine that can be derived by reacting a dimer or trimer carboxylic acid with a polyetheramine.

Preferably, the aliphatic primary polyamine is a polyetherdiamine or polyethertriamine including those polyetherdiamines and polyethertriamines that can be derived from polypropylene oxide or polyethylene oxide. In some preferred embodiments, the aliphatic primary polyamine(s) contain exactly two nitrogen atoms.

Exemplary suitable polyetherdiamines include those corresponding to any of the general formulas:

$H_2NCH_2CH_2CH_2O[CH_2CH_2O]_nCH_2CH_2CH_2NH_2$ (II)

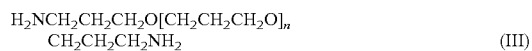

$H_2NCH_2CH_2CH_2O[CH_2CH_2CH_2O]_n$
$CH_2CH_2CH_2NH_2$ (III)

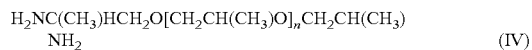

$H_2NC(CH_3)HCH_2O[CH_2CH(CH_3)O]_nCH_2CH(CH_3)$
$NH_2$ (IV)

with n being a positive real number (e.g., an average number) within the range of 1 and 34 such as, for example, 1, 2, 3, 4, 5, or between 1 and 2 (e.g., 1.5 or 1.7), between 2 and 3 (e.g., 2.5 or 2.7), between 3 and 4 (e.g., 3.5 or 3.7), between 4 and 5 (e.g., 4.5 or 4.7), or n being 31, 32, 33, or between 31 and 33.

Suitable aliphatic primary diamines are commercially available as PC AMINE DA from Performance Chemicals Handels GmbH, Hamburg, Germany, or under the trade designation JEFFAMINE from Huntsman Corp., The Woodlands, Texas (e.g., JEFFAMINE D-230 or JEFFAMINE D-400).

Exemplary aliphatic primary triamines can be represented by formula (V):

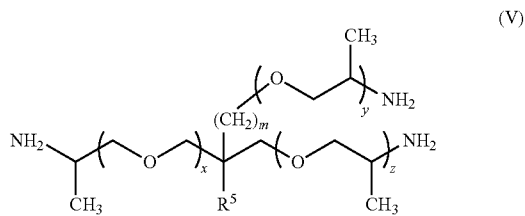

(V)

wherein m, x, y, and z are each independently positive real numbers positive real number (e.g., an average number) within the range of 1 and 34 such as, for example, 1, 2, 3, 4, 5, or between 1 and 2 (e.g., 1.5 or 1.7), between 2 and 3 (e.g., 2.5 or 2.7), between 3 and 4 (e.g., 3.5 or 3.7), between 4 and 5 (e.g., 4.5 or 4.7). $R^5$ represents H or alkyl having from 1 to 4 carbon atoms (e.g., methyl, ethyl, propyl, or butyl).

Compounds of this type are commercially available, for example, under the trade designation Jeffamine T (e.g., Jeffamine T-403, Jeffaine T-3000, and Jeffamine T-5000) from Huntsman Corp.

Based on total weight of components c)-f), Part B includes 1 to 3 weight percent, preferably 1.5 to 2.5 weight percent, of at least one tris(2,4,6-dialkylaminoalkyl) phenol having from 13 to 24 carbon atoms (i.e., the total amount of tris(2,4,6-dialkylaminoalkyl) phenol(s)). Examples include tris(2,4,6-dimethylaminoethyl) phenol, tris(2,4,6-diethylaminoethyl) phenol, tris(2,4,6-dimethylaminopropyl) phenol, tris(2,4,6-dimethylaminomethyl) phenol, tris(2,4,6-diethylaminopropyl) phenol. One preferred compound is tris (2,4,6-dimethylaminomethyl) phenol, which is available as ANCAMINE K54 from Evonik Industries, Essen, Germany.

Based on total weight of components c)-f), Part B includes 1 to 3 weight percent, preferably 1.5 to 2.5 weight percent, of at least one aliphatic tertiary 1,3-bis(N,N-dialkylaminoalkyl) urea having from 6 to 24 carbon atoms (i.e., the total amount of aliphatic tertiary 1,3-bis(N,N-dialkylaminoalkyl) urea(s)). In some embodiments, the aliphatic tertiary 1,3-bis(N,N-dialkylaminoalkyl) urea is represented by formula (VI):

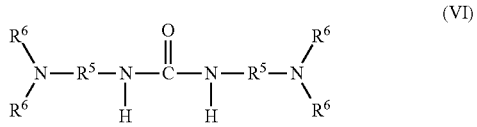

wherein each $R^5$ independently represents a divalent alkylene group having from 2 to 4 carbon atoms (e.g., methylene, ethylene, propylene, or butylene) and each $R^6$ independently represents an alkyl group having 1 to 4 carbon atoms (e.g., methyl, ethyl, propyl, or butyl). Examples include 1,3-bis(3-dimethylaminobutyl) urea, 1,3-bis(3-dimethylaminopropyl) urea, 1,3-bis(3-dimethylaminoethyl) urea, 1,3-bis(3-diethylaminobutyl) urea, 1,3-bis(3-diethylaminopropyl) urea, and 1,3-bis(3-diethylaminoethyl) urea. One preferred compound is 1,3-bis(3-dimethylaminopropyl) urea, which is commercially available as VERSAMID EH-50 from Huntsman Corporation, The Woodlands, Texas.

Based on total weight of components c)-f), Part B includes 1 to 5 weight percent, preferably 1.5 to 3 weight percent, of at least one an alkali metal nitrate or an alkaline earth nitrate (i.e., the total amount of alkali metal nitrate(s) and alkaline earth nitrate(s)). Examples of suitable alkali metal nitrates and alkaline earth nitrates include lithium nitrate, sodium nitrate, potassium nitrate, rubidium nitrate, cesium nitrate, beryllium nitrate, magnesium nitrate, calcium nitrate, strontium nitrate, barium nitrate. Of these, calcium nitrate, magnesium nitrate, sodium nitrate and potassium nitrate are often preferred.

The relative amounts of Part A and Part B typically will depend on the stoichiometry of the reactive species contained in each part. Often the molar ratio of active amine hydrogens to epoxy functionalities is greater than 1; for example, from 1.10 to 1.30, although other amounts may also be used. Selection of an appropriate ratio is within the capability of those skilled in the art.

Likewise, the ratio of the total combined weight of components a) and b) to the total combined weight of components c)-f) is in the range 1.0 to 1.5, preferably 1.2 to 1.4, and more preferably 1.3 to 1.4.

While not required, Part A and/or Part B of two-part adhesive compositions according to the present disclosure preferably include one or more reflective pigments to enhance visualization of color. Examples of suitable reflective pigments include reflective metal flakes and powders (e.g., aluminum flakes and powders, silver flakes and powders, or copper flakes and powders) and white pigments (e.g., titanium dioxide, white pearl mica, porcelain mica, and zinc oxide). Any useful amount of reflective pigment may be selected. Typical amounts range from 0.5 to 10 weight percent of the total combined weight of Part A and Part B.

While not required, Part A and/or Part B of two-part adhesive compositions according to the present disclosure may further include optional additive(s) such as, for example, toughening agent(s), reactive diluent(s), rheology modifier(s), adhesion promoter(s), flame retardant(s), anti-oxidant(s), UV-protecting agent(s), non-reflective pigment and/or dyes, solvent, and combinations thereof. Any desired additive and amount may be used provided that it does not substantially interfere with the function of the visual working life indicator in the two-part epoxy adhesive composition. The optimum amounts of additive(s) typically will depend on the amounts and characteristics of the other ingredients present in the curing agent and/or the curable epoxy resin or in the total curable composition. Optimum amounts can be identified through routine experiments for example, by measuring the Brookfield viscosity of the composition, or the characteristics of the cured composition.

Exemplary toughening agents include butadiene-(acrylo) nitrile rubbers (BNR). BNRs are copolymers comprising repeating units derived from 1,2-butadiene and/or 1,3-butadiene and a nitrile-function containing olefin, such as e.g., 2-propenenitrile (acrylonitrile).

Typical BNRs have a Brookfield viscosity (at 27° C.) of greater 80000 and less than 600000 Pa·s (pascal-seconds). Preferably the BNRs have a low viscosity (such as a Brookfield viscosity of from about 100 000 to about 300 000 Pa·s at 27° C.). The BNRs may be solid or liquid at ambient conditions. The butadiene acrylonitrile rubber is preferably amine-terminated. Suitable BNRs are commercially available, for example, under the trade designation HYCAR from Emerald Performance Materials, Vancouver, Washington. Core-shell rubber particles may also be used as tougheners. Such materials include core-shell rubber (CSR) particles dispersed in epoxy resin that is available as KANE ACE MX-154 and KANE ACE MX-257 from Kaneka Corporation, Tokyo, Japan.

Reactive diluent(s) may be added to control the flow characteristics of the two-part epoxy adhesive composition (e.g., before or after mixing Part A with Part B). Preferably, the diluent(s) is/are part of Part A. Suitable diluents can have at least one reactive terminal group and, preferably, a saturated or unsaturated cyclic backbone. Preferred reactive terminal groups include glycidoxy groups. Examples of suitable diluents include the diglycidyl ether of resorcinol, diglycidyl ether of cyclohexanedimethanol, diglycidyl ether of neopentyl glycol, diglycidyl ether of 1,4 butanediol, diglycidyl ether of 1,6 hexanediol, triglycidyl ether of trimethylolpropane. Commercially available reactive diluents include, for example, those available as HELOXY MODIFIER 107 from Hexion (Columbus, Ohio), EPODIL 757 from Air Products (Allentown, Pennsylvania), and EPILOX P13-26 from Leuna-Harze (Leuna, Germany).

The optimum amounts of reactive diluent(s) typically will depend on the amounts and characteristics of the other ingredients present in the curing agent or in the total composition. Optimum amounts can be identified through routine experiments for example, by measuring the Brookfield viscosity of the curing agent.

Examples of rheology modifiers include, but are not limited to, silica-gels, Ca-silicates, phosphates, molybdates, fumed silica, clays such as bentonite or wollastonite, organoclays, aluminum-trihydrates, hollow-glass-microspheres; hollow-polymeric microspheres and calcium-carbonate. Commercially available rheology controlling agents, include, for example: a synthetic amorphous silica/calcium hydroxide mixture available as SHIELDEX AC5 from Grace Davison (Columbia, Maryland); CAB-O-SIL TS 720 (Cabot GmbH, Hanau, Germany); hydrophobic fumed silica-treated with polydimethyl-siloxane-polymer; glass-beads class IV (250-300 microns) available as Micro-billes de verre 180/300 (CVP S.A., France); glass bubbles K37 from 3M Company (Maplewood, Minnesota); amorphous silica available as MINSIL SF 20 (3M Company); amorphous fumed silica available as APYRAL 24 ESF from Nabaltec GmbH (Schwandorf, Germany); treated fumed silica available as AEROSIL R.202 from Evonik (Essen, Germany); potassium magnesium aluminum silicate; polydimethylsilane-surface-functionalized fumed silica; and combinations thereof.

Examples of flame retardants include, but are not limited to, aluminum trihydrates, or magnesium hydroxides, red phosphorous and ammonium polyphosphate. Examples of commercially available products include Portaflame SG40 (Ankerpoort, the Netherlands), aluminum trihydrate, epoxysilane-functionalized (2 wt %) aluminum trihydrate.

Pigments may include inorganic or organic pigments. Typical examples include but are not limited to ferric oxide, brick dust, carbon black, titanium oxide, and combinations thereof.

Adhesion promoters for example, silane-containing compounds may or may not be included. An example of a commercially available adhesion promoter includes SILANE Z-6040 γ-glycidoxypropyltrimethoxysilane from DOW-Corning (Midland, Michigan).

When mixed to together Part A and Part B begin to react, forming a reaction product, and for a period of time (i.e., the working time) may be handled and used for bonding two substrates together. Once cure advances beyond a certain point (e.g., the working time) reliable bonding may not be achieved. The present disclosure provides two-part epoxy adhesives that, when mixed together, change color at a point during curing at or before working time thereby indicating to the user that the material should no longer be used for bonding.

Exemplary substrates include metals (e.g., steel, galvanized steel), graphite composite, fiberglass, thermoplastics, thermosets, glass, and rubber. Dissimilar substrates or similar substrates may be used.

Mixing may be active (e.g., using an agitator mixer) or passive (e.g., using a static mixing nozzle). In some preferred embodiments, the reaction product is flowable and curable under ambient conditions (e.g., 21° C., 1 atm (101 kPa)). Application of the mixed adhesive (i.e., typically a reaction product) to one or both of the substrates to be bonded may be done according to any of numerous well-known methods (e.g., a glue gun having a static mixing nozzle or a robotic dispenser).

In some preferred embodiments, the reaction product ultimately cures to the point that according to ASTM test method D1002-10 (2019) "Standard Test Method for Apparent Shear Strength of Single-Lap-Joint Adhesively Bonded Metal Specimens by Tension Loading (Metal-to-Metal)", the reaction product has an overlap shear strength of at least 10 megapascals when bonding steel (e.g., including hot-dipped galvanized steel) specimens.

While the reaction product is capable of undergoing an abrupt color change visible to the unaided human eye that indicates curing has advanced to a predetermined working life endpoint of the reaction product, in some embodiments it may be desirable to compare color of the reaction product against a working time endpoint reference color standard.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

The materials in Table 1, below, were used in the Base Resin formulations in the Examples.

TABLE 1

| DESIGNATION | DESCRIPTION | SOURCE |
| --- | --- | --- |
| EPON 828 | Bisphenol-A diglycidyl ether, having an epoxy equivalent weight of 185 to 192, available as EPON RESIN 828 | Hexion Inc., Columbus, Ohio |
| MX154 | Bisphenol A type epoxy resin (bifunctional epoxy resin, epoxy equivalent: 189 g/eq): 60% by mass, butadiene-based core-shell type rubber particles (volume average particle size: 100 nm): 40% by mass, available as KANE ACE MX-154 | Kaneka Corporation, Minato City, Tokyo, Japan |
| H107 | A diglycidyl ether of cyclohexanedimethanol, having an epoxy equivalent weight of 155 to 165, available as HELOXY 17 | Hexion Inc. |
| MR 8830 | calcite nanoparticle-filled epoxy resin available as 3M MATRIX RESIN 8830, 37.9 weight percent epoxy resin | 3M Company, Maplewood, Minnesota |
| VPS 4721 | A high molecular weight epoxy functionalized silane, available as DYNASYLAN VPS 4721 | Evonik Industries, Essen, Germany |
| SANTICIZER 141 | 2-ethylhexyl diphenyl phosphate, available as SANTICIZER 141 | Valtris Specialty Chemicals, Independence, Ohio |
| IONOL 220 | 4,4'-methylene-bis-(2,6-di-tert-butylphenol), available as IONOL 220 | Oxiris Chemicals S.A., Barcelona, Spain |
| o-cresolphthalein | 3,3-Bis(4-hydroxy-3-methylphenyl)-2-benzofuran-1(3H)-one, available as o-cresolphthalein | Sigma-Aldrich, St. Louis, Missouri |
| Bromothymol Blue | 3',3"-dibromothymolsulfonphthalein, available as Bromothymol Blue | Sigma-Aldrich |
| R202 | Hydrophobic fumed silica, available as AEROSIL R 202 | Evonik Industries |
| K37 | Hollow glass microspheres with a density of 0.37 g/cm$^3$, available as 3M GLASS BUBBLES K37 | 3M Company |

The materials in Table 2, below, were used in the Accelerator Resin formulations in the Examples.

TABLE 2

| DESIGNATION | DESCRIPTION | SOURCE |
|---|---|---|
| AL NCT FLAKE | Aluminum pigment with a $D_{50}$ of 52 micrometers, available as STANDART Lac NCT Aluminum Powder | Eckart GmbH, Hartenstein, Germany |
| AL POWDER—120 | Atomized aluminum powder with a $D_{90}$ of 74 micrometers. Available as 120 ATOMIZED POWDER | Eckart GmbH |
| BALLOTINI IMPACT BEADS | Spherical glass beads approximately 250 micrometers in size, available as BALLOTINI IMPACT BEADS | Potters Industries, Valley Forge, Pennsylvania |
| CAN | Calcium nitrate tetrahydrate ($Ca(NO_3)_2 \cdot 4\ H_2O$) | VWR International. (Radnor, PA) |
| DI WATER | Deionized water | |
| EC 331 | 3,3'-Dimethyl-4,4'-diaminodicyclohexylmethane, available as BAXXODUR EC 331 | BASF, Ludwigshafen, Germany |
| EH-50 | 1,3-bis(3-dimethylamino)propyl)urea, available as VERSAMID EH-50) | Huntsman Corporation, The Woodlands, Texas |
| GARAMITE 1958 | Powdered rheology additive based on organophilic phyllosilicates, available as GARAMITE 1958 | BYK (Wesel, Germany) |
| JD230 | Polyetheramine; difunctional, primary amine with an average molecular weight of about 230, available as JEFFAMINE D-230 | Huntsman Corporation |
| JD400 | Polyetheramine; difunctional, primary amine with an average molecular weight of about 400, available as JEFFAMINE D-400 | Huntsman Corporation |
| K54 | tris(2,4,6-dimethylaminomethyl)phenol, available as ANCAMINE K54 | Evonik Industries, Essen, Germany |
| MICAFORT PW80 | Wet ground potassium magnesium aluminum silicate, available as MICAFORT PW80 | LKAB Minerals AB, Luleå, Sweden |
| MX154 | Surface-functionalized core-shell rubber (CSR) particles dispersed in epoxy, available as KANE ACE MX-154 | Kaneka Corporation, Minato City, Tokyo, Japan |
| MX257 | Non-functionalized core-shell rubber (CSR) particles dispersed in epoxy, available as KANE ACE MX-257, 63 weight percent epoxy content | Kaneka Corporation |
| NYGLOS M15 | High purity, high aspect ratio Wollastonite, available as NYGLOS M15 | Imerys S.A., Paris, France |
| R208 | Polydimethylsilane surface-functionalized fumed silica, available as AEROSIL R 208 | Evonik Industries |

Preparation of Base Resin Compositions BR-A and BR-B

Base resins corresponding to the weight fractions listed in Table 3 were prepared by measuring the components into a DAC mixing cup. The components of Compositions BR-A and BR-B were mixed using a DAC 400 FVZ SPEEDMIXER (FlackTek Inc., Landrum, South Carolina) at 2000 revolutions per minute (RPM) for 2 minutes. The cup was briefly checked, and the mixing process was repeated until the mixture was homogeneous.

TABLE 3

| | COMPOSITION, weight percent of components | |
|---|---|---|
| COMPONENT | BR-A | BR-B |
| MX154 | 53.0 | 53.0 |
| EPON 828 | 9.5 | 9.5 |
| MR8830 | 24.2 | 24.2 |
| H107 | 0.9 | 0.9 |
| VPS 4721 | 3.5 | 3.5 |
| IONOL 220 | 1.3 | 1.3 |
| SANTICIZER 141 | 3.1 | 3.1 |
| o-CRESOLPHTHALEIN | 0.2 | 0.2 |
| BROMOTHYMOL BLUE | — | 0.02 |
| R202 | 0.5 | 0.5 |
| K37 | 3.9 | 3.9 |

Preparation of Preparatory Examples PE1-PE3

To make each composition in Table 4, CAN, if required, was first dissolved into JD400 and JD230 with the aid of mild heating (50° C.). MX257 and MX154 were weighed out according to the weight fractions in Table 4 and mixed using a DAC 400 FVZ SPEEDMIXER at 2000 (RPM) for 2 minutes. CAN/amine solutions were further added into corresponding mixing cups and mixed at 2,000 RPM for another 2 minutes. After mixing, each mixture was placed into an oven held at a temperature of 65° C. for 110 minutes. They were then removed from the oven and allowed to cool to room temperature.

TABLE 4

| COMPONENT | PE1 | PE2 | PE3 |
|---|---|---|---|
| JD400 | 42.1 | 50.0 | 42.0 |
| JD230 | 10.5 | 2.6 | 10.5 |
| MX257 epoxy | 15.8 | 10.5 | 15.8 |
| MX154 epoxy | 31.6 | 36.9 | 31.5 |
| CAN | — | — | 0.3 |

COMPOSITION, weight percent of components

Preparation OF Accelerator Resin Compositions AR-A to AR-AA

Accelerator resins corresponding to the weight fractions listed in Table 5 were prepared by first dissolving CAN into JD400 and JD230 with the aid of mild heating (50° C.). This mixture was then poured into a DAC mixing cup. The remaining components of Compositions AR-A to AR-AA were mixed using a DAC 400 FVZ SPEEDMIXER. Each composition was first mixed at 2000 rpm for 2 minutes. This mixing procedure was repeated for at least one other time until the mixture was homogeneous. R208 was added last and mixed at 2000 rpm for 2 minutes after all other components were fully mixed.

TABLE 5

| COMPONENT | AR-A | AR-B | AR-C | AR-D | AR-E | AR-F | AR-G | AR-H | AR-I | AR-J | AR-K | AR-L | AR-M | AR-N |
|---|---|---|---|---|---|---|---|---|---|---|---|---|---|---|
| JD230 | 23.5 | 20.8 | 20.2 | 20.2 | 20.2 | 20.0 | 19.9 | 20.2 | 20.0 | 20.2 | 23.7 | 23.6 | 23.5 | 21.8 |
| JD400 | 1.0 | 4.9 | 4.8 | 4.8 | 4.8 | 4.7 | 4.7 | 4.8 | 4.8 | 4.8 | 1.0 | 1.0 | 1.0 | 2.5 |
| CAN | 1.6 | — | — | — | 3.0 | 1.5 | 2.8 | 2.3 | 1.5 | 0.8 | 1.6 | 1.6 | 1.6 | 2.2 |
| PE1 | — | 49.3 | 47.8 | 47.8 | 47.8 | 23.4 | 47.2 | 47.8 | 47.8 | 47.8 | — | — | — | — |
| PE2 | 46.9 | — | — | — | — | — | — | — | — | — | 47.2 | 47.0 | 46.8 | 27.1 |
| PE3 | — | — | — | — | — | 24.1 | — | — | — | — | — | — | — | 19.7 |
| EC 331 | 6.6 | 6.9 | 6.7 | 6.7 | 6.7 | 6.7 | 6.7 | 6.7 | 6.7 | 6.7 | 6.6 | 6.6 | 6.6 | 6.7 |
| DI WATER | 0.2 | — | — | — | — | — | — | — | — | — | 0.2 | 0.2 | 0.2 | 0.1 |
| K54 | 1.5 | — | — | 3.0 | — | 0.8 | — | 0.8 | 1.5 | 2.3 | 1.6 | 1.5 | 1.5 | 1.1 |
| EH-50 | 1.5 | — | 3.0 | — | — | 0.8 | 0.8 | — | — | — | 0.8 | 1.3 | 1.8 | 1.5 |
| GARAMITE 1958 | 2.4 | 2.6 | 2.5 | 2.5 | 2.5 | 2.5 | 2.4 | 2.5 | 2.5 | 2.5 | 2.5 | 2.4 | 2.4 | 2.4 |
| NYGLOS M15 | 3.2 | 3.4 | 3.3 | 3.3 | 3.3 | 3.9 | 3.9 | 3.3 | 3.3 | 3.3 | 3.2 | 3.2 | 3.2 | 3.5 |
| MICAFORT PW80 | 0.5 | 0.5 | 0.5 | 0.5 | 0.5 | 0.5 | 0.5 | 0.5 | 0.5 | 0.5 | 0.5 | 0.5 | 0.5 | 0.5 |
| AL POWDER-120 | 3.9 | 4.1 | 4.0 | 4.0 | 4.0 | 3.9 | 3.9 | 4.0 | 4.0 | 4.0 | 3.9 | 3.9 | 3.9 | 3.9 |
| AL NCT FLAKE | 2.9 | 3.1 | 3.0 | 3.0 | 3.0 | 2.9 | 2.9 | 3.0 | 3.0 | 3.0 | 2.9 | 2.9 | 2.9 | 2.9 |
| BALLOTINI IMPACT BEADS | 1.5 | 1.5 | 1.5 | 1.5 | 1.5 | 1.5 | 1.5 | 1.5 | 1.5 | 1.5 | 1.5 | 1.5 | 1.5 | 1.5 |
| R208 | 2.7 | 2.9 | 2.8 | 2.8 | 2.8 | 2.8 | 2.8 | 2.8 | 2.8 | 2.8 | 2.7 | 2.7 | 2.7 | 2.7 |

| COMPONENT | AR-O | AR-P | AR-Q | AR-R | AR-S | AR-T | AR-U | AR-V | AR-W | AR-X | AR-Y | AR-Z | AR-AA |
|---|---|---|---|---|---|---|---|---|---|---|---|---|---|
| JD230 | 21.5 | 22.6 | 22.4 | 20.0 | 20.0 | 20.0 | 20.0 | 19.8 | 19.8 | 20.2 | 20.0 | 20.0 | 20.0 |
| JD400 | 2.6 | 2.2 | 2.2 | 4.7 | 4.7 | 4.7 | 4.7 | 4.7 | 4.6 | 4.7 | 4.7 | 4.7 | 4.7 |
| CAN | 2.2 | 1.1 | 1.1 | 1.5 | 1.5 | 1.5 | 1.5 | 2.8 | — | — | — | — | — |
| PE1 | — | 15.3 | 14.8 | — | — | — | 23.5 | 47.2 | 47.1 | 48.1 | 47.6 | 47.6 | 47.6 |
| PE2 | 25.9 | 32.1 | 32.1 | — | — | — | — | — | — | — | — | — | — |
| PE3 | 20.3 | — | — | 47.4 | 47.6 | 47.4 | 24.1 | — | — | — | — | — | — |
| EC 331 | 6.6 | 6.7 | 6.6 | 6.8 | 6.9 | 6.8 | 6.7 | 6.7 | 6.6 | 6.7 | 6.6 | 6.6 | 6.6 |
| DI WATER | 0.1 | 0.1 | 0.1 | — | — | — | — | — | — | — | — | — | — |
| K54 | 2.0 | 1.1 | 2.0 | 1.3 | 1.1 | 1.5 | 0.9 | 0.2 | 2.0 | 1.0 | 1.0 | 2.0 | 1.5 |
| EH-50 | 1.5 | 1.5 | 1.5 | 0.2 | — | — | 0.5 | 0.6 | 2.0 | 1.0 | 2.0 | 1.0 | 1.5 |
| GARAMITE 1958 | 2.4 | 2.5 | 2.4 | 2.5 | 2.5 | 2.5 | 2.5 | 2.4 | 2.4 | 2.5 | 2.5 | 2.5 | 2.5 |
| NYGLOS M15 | 3.5 | 3.3 | 3.2 | 4.0 | 4.0 | 4.0 | 3.9 | 3.9 | 3.9 | 4.0 | 3.9 | 3.9 | 3.9 |
| MICAFORT PW80 | 0.5 | 0.5 | 0.5 | 0.5 | 0.5 | 0.5 | 0.5 | 0.5 | 0.5 | 0.5 | 0.5 | 0.5 | 0.5 |
| AL POWDER-120 | 3.8 | 3.9 | 3.9 | 3.9 | 3.9 | 3.9 | 3.9 | 3.9 | 39 | 4.0 | 3.9 | 3.9 | 3.9 |
| AL NCT FLAKE | 2.9 | 3.0 | 2.9 | 3.0 | 3.0 | 3.0 | 3.0 | 3.0 | 2.9 | 3.0 | 3.0 | 3.0 | 3.0 |
| BALLOTINI IMPACT BEADS | 1.4 | 1.5 | 1.5 | 1.5 | 1.5 | 1.5 | 1.5 | 1.6 | 1.5 | 1.5 | 1.5 | 1.5 | 1.5 |
| R208 | 2.7 | 2.8 | 2.7 | 2.8 | 2.8 | 2.8 | 2.8 | 2.8 | 2.7 | 2.8 | 2.8 | 2.8 | 2.8 |

Adhesive Color Change Measurement

For the following Examples and Comparative Examples, 2 parts by weight of a base resin composition and 1 part by weight of an accelerator resin were measured into DAC mixing cups, hand mixed for 1 minute, and speed mixed using a DAC 600.2 VAC-LR SPEEDMIXER (FlackTek Inc.) for 4 minutes under vacuum program (800 rpm, 20 sec, atmospheric pressure; 800 rpm, 40 sec, 500 mbar; 900 rpm, 120 sec, 50 mbar; 1000 rpm, 60 sec, 50 mbar) to form an adhesive composition. For the following adhesive compositions, time to purple was recorded when the sample changed color from metallic silver to purple. The cured adhesive compositions were checked after 24 hours to see if the purple color persisted. Results for the color change experiments are collected in the Table below.

TABLE 6

| | ACCELERATOR RESIN | BASE RESIN | K54 | EH-50 | CAN | TIME TO PURPLE (Minutes) | COLOR PERSIST |
|---|---|---|---|---|---|---|---|
| EXAMPLE 1 | AR-A | BR-A | 1.5 | 1.5 | 1.6 | 140 | YES |
| COMPARATIVE EXAMPLE 1 | AR-B | BR-A | — | — | — | NO CHANGE | N/A |
| COMPARATIVE EXAMPLE 2 | AR-C | BR-A | — | 3.0 | — | <60 | YES |
| COMPARATIVE EXAMPLE 3 | AR-D | BR-A | 3.0 | — | — | >240 | YES |
| COMPARATIVE EXAMPLE 4 | AR-E | BR-A | — | — | 3.0 | NO CHANGE | N/A |
| EXAMPLE 2 | AR-F | BR-A | 0.8 | 0.8 | 1.5 | 160 | YES |
| COMPARATIVE EXAMPLE 5 | AR-G | BR-A | — | 0.8 | 2.8 | 100 | NO |
| COMPARATIVE EXAMPLE 6 | AR-H | BR-B | 0.8 | — | 2.3 | >180 | YES |
| COMPARATIVE EXAMPLE 7 | AR-I | BR-B | 1.5 | — | 1.5 | >180 | YES |
| COMPARATIVE EXAMPLE 8 | AR-J | BR-B | 2.3 | — | 0.8 | >180 | YES |
| EXAMPLE 3 | AR-K | BR-A | 1.6 | 0.8 | 1.6 | 290 | YES |
| EXAMPLE 4 | AR-L | BR-A | 1.5 | 1.3 | 1.6 | 180 | YES |
| EXAMPLE 5 | AR-M | BR-A | 1.5 | 1.8 | 1.6 | 180 | YES |
| EXAMPLE 6 | AR-N | BR-A | 1.1 | 1.5 | 2.2 | 120 | YES |
| EXAMPLE 7 | AR-O | BR-A | 2.0 | 1.5 | 2.2 | 120 | YES |
| EXAMPLE 8 | AR-P | BR-A | 1.1 | 1.5 | 1.1 | 145 | YES |
| EXAMPLE 9 | AR-Q | BR-A | 2.0 | 1.5 | 1.1 | 160 | YES |
| EXAMPLE 10 | AR-R | BR-A | 1.3 | 0.2 | 1.5 | 300 | YES |
| COMPARATIVE EXAMPLE 9 | AR-S | BR-A | 1.1 | — | 1.5 | 300 | YES |
| COMPARATIVE EXAMPLE 10 | AR-T | BR-A | 1.5 | — | 1.5 | 300 | YES |
| COMPARATIVE EXAMPLE 11 | AR-U | BR-A | 0.9 | 0.5 | 1.5 | >180 | YES |
| COMPARATIVE EXAMPLE 12 | AR-V | BR-A | 0.2 | 0.6 | 2.8 | 180 | NO |
| COMPARATIVE EXAMPLE 13 | AR-W | BR-A | 2.0 | 2.0 | — | 40 | YES |
| COMPARATIVE EXAMPLE 14 | AR-X | BR-A | 1.0 | 1.0 | — | 80 | YES |
| COMPARATIVE EXAMPLE 15 | AR-Y | BR-A | 1.0 | 2.0 | — | 40 | YES |
| COMPARATIVE EXAMPLE 16 | AR-Z | BR-A | 2.0 | 1.0 | — | 90 | YES |
| COMPARATIVE EXAMPLE 17 | AR-AA | BR-A | 1.5 | 1.5 | — | 50 | YES |

Overlap Shear Adhesion Measurement

For the following Examples and Comparative Examples, 2 parts by weight of a base resin composition and 1 part by weight of an accelerator resin were measured into DAC mixing cups, hand mixed for 1 minute, and speed mixed using a DAC 600.2 VAC-LR SPEEDMIXER for 4 minutes under vacuum program (800 RPM, 20 sec, atm; 800 RPM, 40 sec, 500 mbar; 900 RPM, 120 sec, 50 mbar; 1000 rpm, 60 sec, 50 mbar) to form an adhesive composition. Hot-dipped galvanized steel laps (1 inch by 4 inch by 0.0315 inch) were cleaned, labelled, abraded, and assembled in a controlled temperature and humidity room (22° C., 50% relative humidity) or at a lab bench. A thick line of the adhesive composition was applied over the abraded area and assembled to form a 10 mm wide bond line. All sides of the bond were checked for any excess adhesive to be cleaned off as well as for missing adhesive from any of the points of contact between the two laps. The assembled lap joints were clamped with small or medium sized binder clips and placed back in the specified conditioning space. After 24 hours from mixing the adhesive composition and forming the lap shear bonds, the bonds were pulled in shear mode on an Instron at a pull rate of 2 mm/min. The resulting cohesive failure and peak measured stress were recorded for analysis. Results for the overlap shear testing are collected in Table 7, below.

TABLE 7

| | ACCELERATOR RESIN | BASE RESIN | K54 | EH-50 | CAN | OVERLAP SHEAR STRENGTH (MPa) |
|---|---|---|---|---|---|---|
| EXAMPLE 1 | AR-A | BR-A | 1.5 | 1.5 | 1.6 | 11.04 |
| COMPARATIVE EXAMPLE 1 | AR-B | BR-A | — | — | — | 0.79 |
| COMPARATIVE EXAMPLE 2 | AR-C | BR-A | — | 3.0 | — | 1.29 |
| COMPARATIVE EXAMPLE 3 | AR-D | BR-A | 3.0 | — | — | 4.74 |
| COMPARATIVE EXAMPLE 4 | AR-E | BR-A | — | — | 3.0 | 13.58 |
| EXAMPLE 2 | AR-F | BR-A | 0.8 | 0.8 | 1.5 | 7.78 |
| COMPARATIVE EXAMPLE 5 | AR-G | BR-A | — | 0.8 | 2.8 | 12.64 |
| COMPARATIVE EXAMPLE 6 | AR-H | BR-B | 0.8 | — | 2.3 | 15.35 |
| COMPARATIVE EXAMPLE 7 | AR-I | BR-B | 1.5 | — | 1.5 | 14.48 |
| COMPARATIVE EXAMPLE 8 | AR-J | BR-B | 2.3 | — | 0.8 | 12.97 |
| EXAMPLE 3 | AR-K | BR-A | 1.6 | 0.8 | 1.6 | 12.6 |
| EXAMPLE 4 | AR-L | BR-A | 1.5 | 1.3 | 1.6 | 12.7 |
| EXAMPLE 5 | AR-M | BR-A | 1.5 | 1.8 | 1.6 | 11.63 |
| EXAMPLE 6 | AR-N | BR-A | 1.1 | 1.5 | 2.2 | 12.59 |
| EXAMPLE 7 | AR-O | BR-A | 2.0 | 1.5 | 2.2 | 13.77 |
| EXAMPLE 8 | AR-P | BR-A | 1.1 | 1.5 | 1.1 | 9.58 |
| EXAMPLE 9 | AR-Q | BR-A | 2.0 | 1.5 | 1.1 | 11.32 |
| EXAMPLE 10 | AR-W | BR-A | 2.0 | 2.0 | — | 7.41 |
| COMPARATIVE EXAMPLE 9 | AR-X | BR-A | 1.0 | 1.0 | — | 3.82 |
| COMPARATIVE EXAMPLE 10 | AR-Y | BR-A | 1.0 | 2.0 | — | 5.25 |
| COMPARATIVE EXAMPLE 11 | AR-Z | BR-A | 2.0 | 1.0 | — | 5.41 |
| COMPARATIVE EXAMPLE 12 | AR-AA | BR-A | 1.5 | 1.5 | — | 4.95 |

Measurement of Color Change

For the following Examples and Comparative Examples, 2 parts by weight of a base resin composition and 1 part by weight of an accelerator resin were measured into DAC mixing cups, hand mixed for 1 minute, and speed mixed using a DAC 600.2 VAC-LR SPEEDMIXER for 4 minutes under vacuum program (800 RPM, 20 sec, atm; 800 RPM, 40 sec, 500 mbar; 900 RPM, 120 sec, 50 mbar; 1000 rpm, 60 sec, 50 mbar) to form an adhesive composition. To measure the LAB and delta E values of the samples, a small blob of adhesive, 1 cm in diameter, was dispensed onto a microscope slide, and a second slide was used to squish the adhesive, capturing it between the two slides.

A multi-angle spectrophotometer (Model MA9X, XORITE Incorporated) was used to measure the L*a*b* color coordinates (45 degree angle) of the adhesive between the two slides. The L*a*b* color coordinates were measured initially after the adhesive composition was formed, when the sample looked purple, and 24 hours after the sample was prepared. The $\Delta E_{L^*a^*b^*}$ values between these increments of time were calculated using the below equation:

$$\Delta E_{L^*a^*b^*} = \sqrt{(L^*_2 - L^*_1)^2 + (a^*_2 - a^*_1)^2 + (b^*_2 - b^*_1)^2}$$

L*a*b* and $\Delta E_{L^*a^*b^*}$ values for the Examples and Comparative Examples are reported in Table 8, below.

TABLE 8

| | ACCELERATOR RESIN | BASE RESIN | LAB INITIAL | | | TIME TO PURPLE WORKING LIFE (MINUTES) | LAB AT PURPLE | | | DELTA E AT PURPLE | DELTA E, 24 HOURS |
|---|---|---|---|---|---|---|---|---|---|---|---|
| | | | L | A | B | | L | A | B | | |
| EXAMPLE 2 | AR-F | BR-A | 59.06 | -0.7 | -0.45 | 160 | 52.17 | 3.45 | -6.99 | 13.46 | 39.97 |
| COMPARATIVE EXAMPLE 5 | AR-G | BR-A | 58.34 | -0.59 | -0.51 | 100 | 52.08 | 5.74 | -7.77 | 11.49 | 5.77 |
| EXAMPLE 1 | AR-A | BR-A | 59 | -0.8 | -0.28 | 140 | 50.2 | 7.64 | -12.21 | 17.36 | 41.56 |
| EXAMPLE 3 | AR-K | BR-A | 60.25 | -0.65 | -0.38 | 290 | 52.42 | 4.19 | -8.9 | 13.74 | 39.03 |
| EXAMPLE 4 | AR-L | BR-A | 59.45 | -0.71 | -0.58 | 180 | 51.76 | 5.58 | -10.69 | 14.17 | 40.87 |
| EXAMPLE 5 | AR-M | BR-A | 59.97 | -0.73 | -0.15 | 180 | 47.12 | 8.92 | -15.83 | 22.45 | 42.85 |
| EXAMPLE 6 | AR-N | BR-A | 59.66 | -0.62 | -0.28 | 120 | 50.5 | 6.99 | -10.44 | 15.66 | 38.98 |
| EXAMPLE 7 | AR-O | BR-A | 59.04 | -0.73 | -0.28 | 120 | 50.15 | 6.64 | -10.6 | 15.81 | 41.32 |
| EXAMPLE 8 | AR-P | BR-A | 59.32 | -0.65 | -0.3 | 145 | 51.96 | 4.27 | -9.15 | 12.72 | 39.85 |
| EXAMPLE 9 | AR-Q | BR-A | 58.79 | -0.77 | -0.47 | 160 | 52.32 | 4.36 | -9.08 | 12.37 | 37.42 |

Working Life Testing at Color Change

Adhesive working life was checked using T-Peel testing. For the following Examples and Comparative Examples, 2 parts by weight of a base resin composition and 1 part by weight of an accelerator resin were measured into DAC mixing cups, hand mixed for 1 minute, and mixed using a DAC 600.2 VAC-LR SPEEDMIXER for 4 minutes (Step 1-800 revolutions per minute (rpm), 20 sec, 1 100 kPa; Step 2-800 rpm, 40 sec, 50 kPa; Step 3-900 rpm, 120 sec, 5 kPa; Step 4-1000 rpm, 60 sec, 5 kPa) to form an adhesive composition. The start for the work time/open time began when the adhesive was dispensed on the metal T-Peel laps. A glass slide of the adhesive was also made to monitor and measure the LAB values at the specified times and track when the adhesive turned purple. The T-Peels were then assembled after the specified work time/open time ended, or in this case, when the adhesive turned purple per the LAB measurement. All sides of the T-Peel bond were checked for any excess adhesive to be cleaned off as well as for missing adhesive from any of the points of contact between the two laps. The assembled T-Peel bonds were placed back in a controlled temperature and humidity room (22° C., 50% relative humidity). 24 hours after the adhesive compositions were mixed, the T-Peels were placed in an oven held at 65° C. for 30 minutes. After this process, the T-Peels were placed back in a controlled temperature and humidity room (22° C., 50% relative humidity). and pulled after 7 days from assembly. The bonds were pulled on an Instron at a pull rate of 2 in/min. The resulting cohesive failure was recorded for analysis. Cohesive failure was determined following ISO 10365. 100% cohesive failure was determined when no bare metal was found either side of the laps; 0% cohesive failure is when bare metal is showing on all of one lap, and all other values is the portion of bare metal compared to the total combined bond area. Bare metal appears shiny; thin film adhesion does not count for cohesive failure. The adhesive was determined to have been bonded past the adhesive working life if the T-Peel sample failed with less than 75% cohesive failure mode.

TABLE 9

| | ACCELERATOR RESIN | BASE RESIN | T-PEEL COHESIVE FAILURE, PERCENT |
|---|---|---|---|
| EXAMPLE 1 | AR-A | BR-A | 100 |
| EXAMPLE 2 | AR-F | BR-A | 83 |
| COMPARATIVE EXAMPLE 5 | AR-G | BR-A | 89 |
| COMPARATIVE EXAMPLE 9 | AR-K | BR-A | 42 |
| EXAMPLE 3 | AR-L | BR-A | 95 |
| EXAMPLE 4 | AR-M | BR-A | 92 |
| EXAMPLE 5 | AR-N | BR-A | 98 |
| EXAMPLE 6 | AR-O | BR-A | 88 |
| EXAMPLE 7 | AR-P | BR-A | 100 |
| EXAMPLE 10 | AR-Q | BR-A | 85 |

The preceding description, given in order to enable one of ordinary skill in the art to practice the claimed disclosure, is not to be construed as limiting the scope of the disclosure, which is defined by the claims and all equivalents thereto.

What is claimed is:

1. A two-part epoxy adhesive comprising:
    a Part A comprising, based on the total weight of components a) and b):
        a) 99.5 to 99.99 weight percent of at least one curable epoxy resin;
        b) 0.01 to 0.5 weight percent of at least one pH indicator dye exhibiting an abrupt color change from colorless to a color in the pH range of 8.0-10.6; and
    a Part B comprising, based on the total weight of components c)-f):
        c) 89 to 97 weight percent of at least one aliphatic primary polyamine;
        d) 1 to 3 weight percent of at least one tris(2,4,6-dialkylaminoalkyl) phenol having from 13 to 24 carbon atoms;
        e) 1 to 3 weight percent of at least one aliphatic tertiary 1,3-bis(N,N-dialkyl-aminoalkyl) urea having from 6 to 24 carbon atoms; and
        f) 1 to 5 weight percent at least one of an alkali metal nitrate and an alkaline earth nitrate,
    wherein the ratio of the total combined weight of components a) and b) to the total combined weight of components c)-f) is in the range 1.0 to 1.5.

2. The two-part epoxy adhesive of claim 1, wherein at least one of Part A and Part B further comprises reflective pigment.

3. The two-part epoxy adhesive of claim 2, wherein the reflective pigment comprises at least one of metal flakes and metal powder.

4. The two-part epoxy adhesive of claim 1, wherein at least one of Part A and Part B further comprises at least one filler selected from the group consisting of core-shell rubber particles, wollastonite, potassium magnesium aluminum silicate, and polydimethylsilane-surface-functionalized fumed silica.

5. The two-part epoxy adhesive of claim 1, wherein the at least one pH indicator dye comprises phenolphthalein or a substituted derivative thereof.

6. The two-part epoxy adhesive of claim 5, wherein the at least one pH indicator dye comprises o-cresolphthalein.

7. The two-part epoxy adhesive of claim 1, wherein the ratio of the total combined weight of components a) and b) to the total combined weight of components c)-f) is in the range 1.3 to 1.4.

8. The two-part epoxy adhesive of claim 1, wherein Part A further comprises from 0.001 to 0.5 weight percent bromothymol blue based on the total weight of Part A.

9. A reaction product prepared by mixing Part A and of Part B of the two-part epoxy adhesive of claim 1.

10. The reaction product of claim 9, wherein according to ASTM test method D1002-10 (2019) "Standard Test Method for Apparent Shear Strength of Single-Lap-Joint Adhesively Bonded Metal Specimens by Tension Loading (Metal-to-Metal)", the reaction product has an overlap shear strength of at least 10 megapascals when bonding hot-dipped galvanized steel specimens.

11. The reaction product of claim 9, wherein the reaction product is flowable and curable, and wherein the reaction product is capable of undergoing a visible color change that indicates curing has advanced to a predetermined working life endpoint of the reaction product.

12. A method of bonding two substrates, the method comprising:
    disposing the reaction product of claim 11 between first and second substrates prior to said undergoing the visible color change; and
    sufficiently curing the reaction product to form an adhesive bond between the first and second substrates.

13. The method of claim 12, wherein at least one of the first and second substrates comprises steel.

14. The method of claim 13, wherein at least one of the first and second substrates comprises galvanized steel.

15. The method of claim 13, wherein the method further comprises comparing color of the reaction product against a working time endpoint reference color standard.

* * * * *

UNITED STATES PATENT AND TRADEMARK OFFICE
CERTIFICATE OF CORRECTION

PATENT NO. : 12,305,083 B1
APPLICATION NO. : 18/856309
DATED : May 20, 2025
INVENTOR(S) : Zachary J. Thompson Page 1 of 1

It is certified that error appears in the above-identified patent and that said Letters Patent is hereby corrected as shown below:

In the Claims

<u>Column 18</u>
Line 43-44 (approx.), In Claim 9, delete "of Part B of the" and insert -- Part B of the --, therefor.

Signed and Sealed this
Sixteenth Day of December, 2025

John A. Squires
*Director of the United States Patent and Trademark Office*